May 11, 1937.  W. B. STEVENS  2,079,971
CREAM REMOVER
Filed Sept. 23, 1936
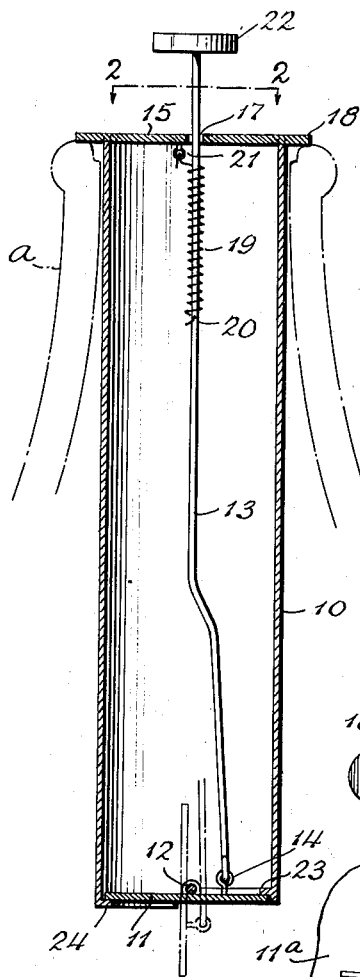
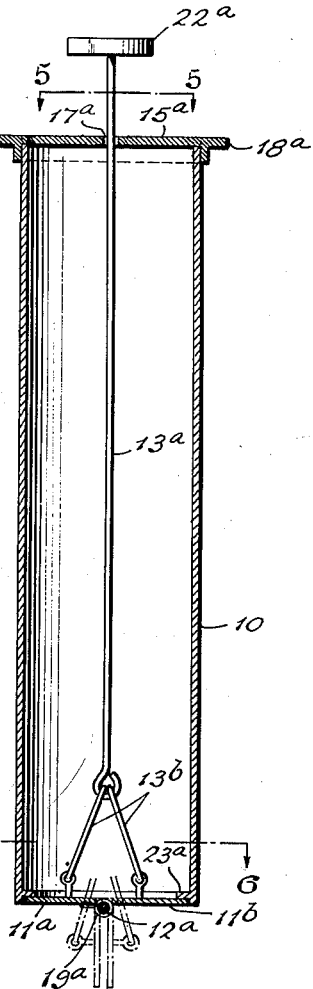
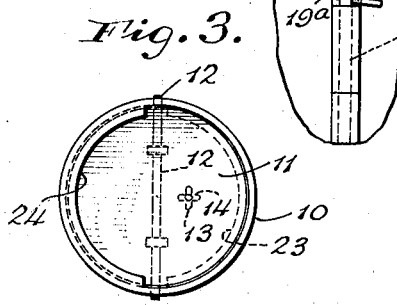
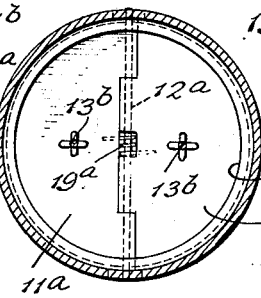
INVENTOR
WILLARD B. STEVENS
BY
ATTORNEYS Patented May 11, 1937

2,079,971

UNITED STATES PATENT OFFICE 2,079,971

CREAM REMOVER

Willard B. Stevens, Arlington, N. J.

Application September 23, 1936, Serial No. 102,075

6 Claims. (Cl. 210—51.5)

My invention relates to devices for removing cream or top milk from milk bottles or other milk containers and has for its object to provide a cream remover which may be inserted into a milk bottle or other container for the purpose of removing the cream or top milk therefrom. The invention contemplates further the provision of a device capable of being inserted into the milk bottle or other container without materially agitating the contents thereof and without displacing said contents sufficiently to cause an overflow thereof. A further object of the invention is to provide a device of the indicated type which is attractive in appearance, efficient in operation, and easy to maintain in a sanitary condition. Other more specific objects will appear from the description hereinafter and the features of novelty will be pointed out in the claims.

In the accompanying drawing which illustrates several examples of the invention without defining its limits, Fig. 1 is a central longitudinal section of the cream remover; Fig. 2 is a plan view partly in section on the line 2—2 of Fig. 1; Fig. 3 is a bottom view of the device; Fig. 4 is a central longitudinal section of the cream remover in another form; Fig. 5 is a plan view thereof partly in section on the line 5—5 of Fig. 4; Fig. 6 is a cross section on a somewhat enlarged scale on the line 6—6 of Fig. 4 and Fig. 7 is a fragmentary bottom view of the device shown in Fig. 4.

In all of its forms the cream remover comprises a tubular container illustrated in the form of a cylindrical tube 10 preferably made of suitable metal or other material and generally of a diameter to easily fit within the neck of a conventional milk bottle a. The lower end of the tube 10 is open and is closed by means of a movable closure of novel construction and arrangement which normally occupies its closed position and is automatically returned thereto. In the form shown in Figs. 1 and 2 the closure consists of a closure disk 11 of suitable material and of a diameter to easily fit the end of said tube 10; the closure disk 11 is pivotally connected with said tube 10 to swing about an axis 12 coinciding with the diameter of said tube 10 as shown in Figs. 1 and 3. The device further includes resilient means for normally maintaining the closure disk 11 in its closed position and for automatically returning it thereto, said resilient means being further manually operable to pivotally swing the closure disk 11 to an open position in substantial registry with the longitudinal axis of the tube 10. As shown in Fig. 1 the resilient means consists of a rod 13 having its lower end loosely connected at 14 with the closure disk 11 and extending lengthwise of the tube 10 and upwardly beyond the same as illustrated in Fig. 1. To slidably guide the rod 13, the tube 10 is provided at its upper end with a member 15 seated in recesses 16 formed in the tube 10 and secured in place in any convenient manner; the member 15 is provided with a central opening 17 in which the rod 13 is slidably guided and extends diametrically across and beyond the tube 10 to provide finger pieces 18 for the purpose to be more fully set forth hereinafter. A suitable spring 19 is included in the resilient means for normally maintaining the closure disk 11 in its closed position and for returning it thereto; in the form illustrated in Fig. 1 said spring 19 surrounds the rod 13 and has its one end secured thereto at 20 and its other end secured to the member 15 as indicated at 21. To facilitate the operation of the aforesaid resilient means in a manner to swing the closure disk 11 to its open position the rod 13 may be provided at its upper end with a head or equivalent device 22.

In addition to the parts so far described the novel cream remover includes inwardly projecting sealing means located at the open end of the tube 10 and adapted to project over and in surface engagement with the closure exemplified by the disk 11 when the latter is in its closed position, to seal the open end of the tube 10 against leakage. In the form shown in Figs. 1 and 2 the aforesaid sealing means comprises curved flanges 23 and 24 extending partly about the circumference of the tube 10 and projecting inwardly therefrom at different levels as shown in Fig. 1; the flanges 23 and 24 are located so as to project over and in engagement with opposite faces of the closure disk 11 when the latter is in its closed position, without interfering with the pivotal swinging movements of said disk 11 to and from its open position and vice versa.

In utilizing the cream remover so far described, a downward pressure is exerted upon the head 22 to correspondingly move the rod 13 against the tension of the spring 19 and to swing the closure disk 11 on the axis 12 to the open position indicated by dotted lines in Fig. 1; in this open position the closure disk 11 extends edgewise in the direction of the length of the tube 10 and in substantial registry with the longitudinal axis thereof. The described manipulation of the head 22 and its associated elements is facilitated by the finger piece 18 which enables the user to properly grip the tube 10 or its equivalent as will be apparent. While maintaining the closure disk 11 in its open position by a continued downward pressure on the head 22 or its equivalent, the cream remover is inserted into the neck of a milk bottle *a* or equivalent container either until the full length of said tube is within the bottle or the container, or for a predetermined distance as may be desired. In any case, because of the fact that the closure disk 11 occupies an edgewise position and because of the relatively slight thickness of the lower end of the tube 10, the cream remover passes through the cream without displacing the same to any material extent, and without bringing about any agitation thereof which is sufficient to mix the cream with the milk in the upper end of the bottle *a* or its equivalent. As the tube 10 is inserted downwardly into the bottle *a* or other container with the closure disk 11 in its open position the cream will naturally rise within the tube 10. At the proper time the downward pressure on the head 22 or its equivalent, may be released whereupon the spring 19 will immediately and automatically restore the closure disk 11 to its closed position to thereby confine a predetermined quantity of cream in the tube 10. As the device is lifted from the bottle *a* or its equivalent to remove the cream contained in the tube 10 therefrom, the sealing means exemplified by the flanges 23 and 24 will prevent leakage of said cream from the lower end of the tube 10. To remove the cream from the tube 10 it is simply necessary to again adjust the closure disk 11 to its open position by downward pressure upon the head 22 whereupon the cream will flow from the lower end of the tube 10 for instance into a suitable receptacle.

In the form shown in Figs. 4 to 7 inclusive, the closure for closing the lower end of the tube 10 comprises a closure disk consisting of two sections 11ª and 11ᵇ pivotally connected with each other and with the tube 10 by means of a pivot pin 12ª which coincides with a diameter of the tube 10 as shown in Figs. 4 and 6. The resilient means for normally maintaining the closure disk in its closed position and for automatically returning it thereto comprises a rod 13ª extending lengthwise of the tube 10 and upwardly beyond the same; the rod 13ª as shown in Fig. 4 may also be provided at its upper end with a head 22ª or equivalent device, to facilitate the operation of the resilient means in a manner to pivotally swing the closure disk to its open position. In the illustrated example the rod 13ª at its lower end is loosely connected with the respective sections 11ª and 11ᵇ by means of links 13ᵇ as shown in Fig. 4. In this form the spring included in the aforesaid resilient means consists of a coil spring 19ª surrounding the pivot pin 12ª and bearing with its opposite ends against the closure sections 11ª and 11ᵇ respectively in a manner to normally maintain the closure disk in its closed position and to automatically return it thereto as shown in Figs. 6 and 7. In the form of the device now being described a member corresponding to the member 15 of the first form is constructed in the form of a cap 15ª arranged to fit upon and close the upper end of the tube 10 as shown in Fig. 4; the cap 15ª is provided with a central opening 17ª for guiding the rod 13ª and includes portions projecting outwardly beyond the tube 10 to constitute finger pieces 18ª as in the form first described.

The sealing means whereby the lower end of the tube 10 is sealed against leakage when the closure disk is in its closed position is shown in the form of an annular inwardly directed flange 23ª located at the open end of the tube 10 and adapted to project over and in surface engagement with the disk sections 11ª and 11ᵇ as illustrated in Fig. 4.

In using this device a downward pressure is exerted on the head 22ª or its equivalent to correspondingly move the rod 13ª and thereby swing the disk sections 11ª and 11ᵇ on the axis 12ª downwardly toward each other to the open position indicated by dotted lines in Fig. 4. In this open position the sections 11ª and 11ᵇ of the closure disk extend edgewise in the direction of the length of the tube 10 and in substantial registry with the longitudinal axis thereof. With the disk sections 11ª and 11ᵇ in the open position, the tube 10 is inserted into the container exemplified by the milk bottle *a* in the same way as previously described and when the desired amount of cream has risen in the tube 10 pressure is released upon the head 22ª to permit the spring 19ª to automatically swing the sections 11ª and 11ᵇ to the closed position in surface contact with the sealing flange 23ª. The cream remover may then be withdrawn from the bottle *a* or other container and opened to release the cream in the tube 10 by again exerting a downward pressure on the head 22ª.

In all of its forms the cream remover constitutes an efficient device for removing all or a part of the cream contained in a milk bottle *a*, or equivalent container without disturbing the contents sufficiently to mix the cream with the milk and without displacing said contents to an extent sufficient to cause overflow thereof. These characteristics enable the novel cream remover to be repeatedly inserted into the same milk bottle *a* or its equivalent and to thereby remove substantially all of the cream therefrom. The device is attractive in appearance and may be easily maintained in a clean sanitary condition and requires absolutely no skill in its operation and use.

It is to be understood that the illustrated parts of the cream remover may be replaced by other arrangements performing corresponding functions and it is to be particularly noted that the form of the rod 13ª and its connection with the sections 11ª and 11ᵇ may be replaced by many other equivalent arrangements.

Various changes in the specific forms shown and described may be made within the scope of the claims without departing from the spirit of the invention.

I claim:

1. A cream remover adapted to be inserted into a milk receptacle comprising a tubular container having its lower end open, a closure for said open end pivotally connected with said container to swing about an axis coinciding with a diameter of said container, and resilient means for normally maintaining said closure in its closed position and manually operable to pivotally swing said closure to an open position in substantial registry with the longitudinal axis of said container.

2. A cream remover adapted to be inserted into a milk receptacle comprising a hollow cylindrical container having its lower end open, a closure for said open end pivotally connected with said container to swing about an axis coinciding with a diameter of said container, resilient means for normally maintaining said closure in its closed position and manually operable to pivotally swing said closure to an open position in substantial registry with the longitudinal axis of said container, and inwardly projecting sealing means at the open end of said container adapted to project over and in surface engagement with said closure in its closed position to seal said open end against leakage.

3. A cream remover adapted to be inserted into a milk bottle comprising a cylindrical tube having its lower end open, a closure disk for said open end pivotally connected with said tube to swing about an axis coinciding with a diameter of said tube, a member carried by said tube at its upper end and projecting outwardly beyond the same to constitute finger pieces, a rod slidably mounted in said member and having its lower end connected with said closure disk, a head fixed upon the upper end of said rod whereby the latter is operable to pivotally swing said disk to an open edgewise position in substantial registry with the longitudinal axis of said tube, and a spring whereby said disk is normally maintained in its closed position and automatically returned thereto.

4. A cream remover adapted to be inserted into a milk bottle comprising a cylindrical tube having its lower end open, a closure disk for said open end pivotally connected with said tube to swing about an axis coinciding with a diameter of said tube, a member carried by said tube at its upper end and projecting outwardly beyond the same to constitute finger pieces, a rod slidably mounted in said member and having its lower end connected with said closure disk, a head fixed upon the upper end of said rod whereby the latter is operable to pivotally swing said disk to an open edgewise position in substantial registry with the longitudinal axis of said tube, a spring whereby said disk is normally maintained in its closed position and automatically returned thereto, and inwardly directed flanges at the open end of said tube adapted to project over and in engagement with opposite faces of said closure disk to seal said open end against leakage without interfering with the pivotal swinging of said disk to its open position.

5. A cream remover adapted to be inserted into a milk bottle comprising a cylindrical tube having its lower end open, a closure disk for said open end consisting of two sections pivotally connected with each other and with said tube to swing about an axis coinciding with a diameter of said tube, a member carried by said tube at its upper end and having portions projecting outwardly beyond the same to constitute finger pieces, a rod slidably mounted in said member and connected with said disk sections interiorly of said tube, said rod being operable to pivotally swing said disk sections outwardly of said tube to an open edgewise position in substantial registry with the longitudinal axis thereof, and a spring whereby said disk sections are normally maintained in closed position and automatically returned thereto.

6. A cream remover adapted to be inserted into a milk bottle comprising a cylindrical tube having its lower end open, a closure disk for said open end consisting of two sections pivotally connected with each other and with said tube to swing about an axis coinciding with a diameter of said tube, a member carried by said tube at its upper end and having portions projecting outwardly beyond the same to constitute finger pieces, a rod slidably mounted in said member and connected with said disk sections interiorly of said tube, a head fixed upon the upper end of said rod for operating the latter to pivotally swing said disk sections outwardly of said tube to an open edgewise position in substantial registry with the longitudinal axis thereof, a spring carried by said closure disk for normally maintaining the sections thereof in closed position and for automatically returning said sections thereto, and an annular inwardly directed flange at the open end of said tube adapted to project over and in surface engagement with said disk sections in the closed position thereof to seal said tube against leakage.

WILLARD B. STEVENS.